United States Patent [19]

Schneider et al.

[11] Patent Number: 5,093,791
[45] Date of Patent: Mar. 3, 1992

[54] VARIABLE GAIN SYNCHROPHASING

[75] Inventors: Roy W. Schneider, Ellington; Bernard Magliozzi, West Suffield, both of Conn.

[73] Assignee: United Technologies Corporation, Hartford, Conn.

[21] Appl. No.: 531,600

[22] Filed: Jun. 1, 1990

[51] Int. Cl.⁵ .............................................. B64C 11/50
[52] U.S. Cl. ................................ 364/431.01; 416/34; 416/35; 60/702
[58] Field of Search ................ 364/424.01, 431.01; 416/34, 35; 60/702

[56] References Cited

U.S. PATENT DOCUMENTS

| | | | |
|---|---|---|---|
| 3,589,832 | 6/1971 | Harris et al. | 416/34 |
| 3,689,175 | 9/1970 | Hartzell et al. | 416/34 |
| 4,245,955 | 1/1981 | Lambertson | 416/34 |
| 4,653,981 | 3/1987 | Harner et al. | 416/34 |
| 4,659,283 | 4/1987 | Niessen et al. | 416/34 |
| 4,900,226 | 2/1990 | de Vries | 416/34 |
| 4,934,825 | 6/1990 | Martin | 364/431.01 |

Primary Examiner—Thomas G. Black
Attorney, Agent, or Firm—Donald W. Muirhead

[57] ABSTRACT

An aircraft engine propeller synchrophasing system (4) has a gain stage (8) which varies the gain of the system (4) according to the magnitude of the difference between the preferred propeller relative phase and the measured propeller relative phase.

19 Claims, 1 Drawing Sheet

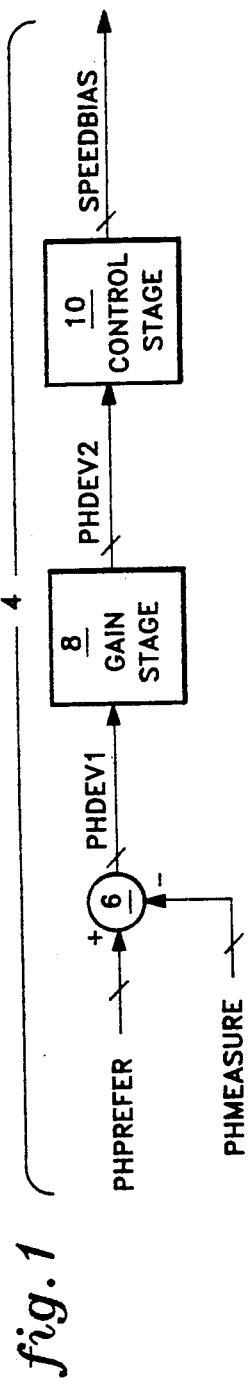
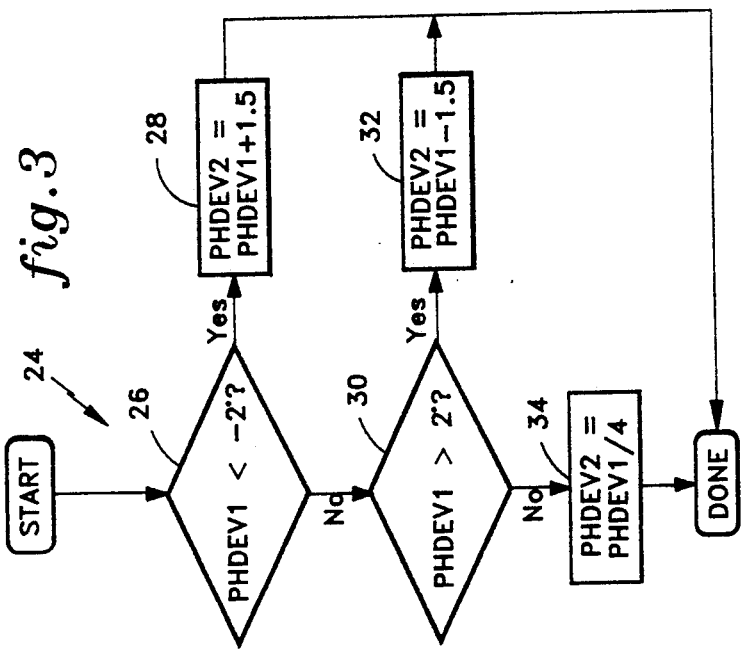
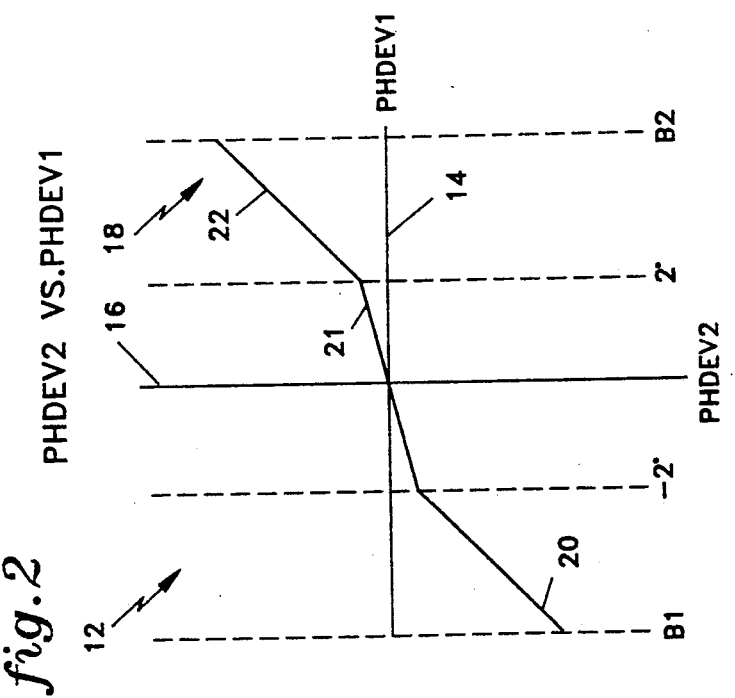

VARIABLE GAIN SYNCHROPHASING

DESCRIPTION

1. Technical Field

This invention relates to the field of aircraft engine propellers and more particularly to the field of synchrophasing for aircraft engine propellers.

2. Background Art

Asynchronous multi-engine aircraft propeller rotation produces harmonic noise of different frequencies. The unequal frequencies result in beats, which are subjectively annoying to passengers in an aircraft cabin. A synchrophasing system eliminates the beats by maintaining a constant relative phase between the propellers. Judicious selection of the constant phase results in cabin noise reduction through mutual cancellation of the noise contribution from each propeller.

The synchrophasing system adjusts relative propeller phase by first measuring the relative phase between a master propeller and one or more slave propellers and then increasing or decreasing the rotational speed of the slave propellers until the measured phase difference equals the preferred phase difference, a predetermined value. The difference between the preferred propeller phase difference and the measured propeller phase difference is the phase deviation. The synchrophasing system continuously adjusts the speed of the slave propellers in order to drive the phase deviation to zero.

The rate of the phase adjustment is a function of the gain of the system. A synchrophasing system having a relatively high gain has a faster rate of phase adjustment than a synchrophasing system having a relatively low gain. A high gain synchrophasing system, which corrects phase deviations more rapidly than a low gain synchrophasing system, is desirable whenever phase deviations are large, such as during propeller transients or periods of high turbulence. However, a high gain system becomes undesirable for small phase deviations because the resulting continuous rapid phase changes induce noticeable propeller noise which can be subjectively annoying to passengers in the aircraft cabin. Therefore, the constant value chosen for the gain of a synchrophasing system represents a compromise between the conflicting requirements for a rapid rate of phase adjustment to provide for large phase deviations and for a slow rate of phase adjustment in order to minimize the subjectively irritating propeller noise caused by rapid phase changes.

DISCLOSURE OF INVENTION

Objects of the invention include a synchrophasing system which adequately provides for large phase deviations without causing continuous rapid phase changes.

According to the present invention, the gain of an aircraft engine propeller synchrophasing system varies according to the magnitude of the phase deviation.

The foregoing and other objects, features and advantages of the present invention will become more apparent in light of the following detailed description of exemplary embodiments thereof, as illustrated in the accompanying drawings.

BRIEF DESCRIPTION OF DRAWINGS

FIG. 1 is a data flow diagram of an aircraft engine propeller synchrophasing system according to the invention.

FIG. 2 is a graph having a plot of the gain characteristic of a gain stage of an aircraft engine propeller synchrophasing system according to the invention.

FIG. 3 is a flowchart illustrating the logic of a gain stage of an aircraft engine propeller synchrophasing system according to the invention.

BEST MODE FOR CARRYING OUT THE INVENTION

Referring to FIG. 1, an aircraft engine propeller synchrophasing control system 4 is comprised of a summer 6, a gain stage 8, and a control stage 10. The system 4 is implemented as software embedded within a microprocessor-based aircraft engine controller (not shown), known to those skilled in the art, which electronically controls various aircraft engine operational parameters, including the relative phase of aircraft engine propellers. The summer 6, the gain stage 8, and the control stage 10 represent separate microprocessor software modules embedded at different addresses within in a ROM (Read Only Memory, not shown). The ROM and a microprocessor (not shown) are part of the controller. The software for the synchrophasing system 4 is executed by the microprocessor every 40 msec.

The system 4 has two input digital signals, PHPREFER and PHMEASURE. The value of (i.e. the magnitude indicated by) the PHPREFER signal, which is expressed in degrees, is indicative of the preferred relative phase of the propellers. The PHPREFER signal can either be stored as a constant within the ROM or can originate from another aircraft system, depending upon a variety of functional requirements known to those skilled in the art. The value of the PHMEASURE signal, which is also expressed in degrees, indicates the measured (i.e. actual) relative phase of the propellers and is determined by means known to those skilled in the art. Theoretically, PHMEASURE can equal a relatively large negative or positive value (i.e. a phase measurement greater than one revolution). However, the value of PHMEASURE is restricted to being greater than an absolute minimum value and less than an absolute maximum value by means described in a copending, commonly owned, U.S. patent application entitled "Improved Method for Synchrophaser ® Measurement and Synchrophaser ® Control", Ser. No. 07/336275, filed on Apr. 11, 1989.

The system 4 attempts to cause the value of the PHMEASURE signal to become equal to the value of the PHPREFER signal by asserting an output digital signal, SPEEDBIAS (expressed in revolutions per minute) which is coupled to the slave propeller speed governor system (not shown) which controls the speed of the slave propeller in a manner known to those skilled in the art. A positive value for the SPEEDBIAS signal requests the slave propeller speed governor system to increase the slave propeller speed. Similarly, a negative value for the SPEEDBIAS signal requests the slave propeller speed governor system to decrease the slave propeller speed. A value of zero for the SPEEDBIAS signal requests the slave propeller speed governor system to maintain the slave propeller speed.

The summer 6 receives the PHPREFER signal and the PHMEASURE signal, by means known to those skilled in the art, and outputs a digital signal, PHDEV1 (expressed in degrees), having a value equal to the difference between the values of the PHPREFER signal and the PHMEASURE signal The value of the PHDEV1 signal is therefore indicative of the phase deviation. Note that because the value of the PHMEASURE signal is bounded and because the value of PHPREFER is a constant, the value of PHDEV1 will also be bounded If the measured relative phase equals the preferred relative phase, then the value of the PHDEV1 signal is zero. The PHDEV1 signal is input to the gain stage 8, which processes the PHDEV1 signal and outputs a digital signal, PHDEV2 (expressed in degrees).

Referring to FIG. 2, a graph 12, illustrates more clearly the operation of the gain stage 8. The graph 12 has a horizontal axis 14 indicative of the value of the PHDEV1 signal and a vertical axis 16 indicative of the value of the PHDEV2 signal. A plot 18, which shows the value of the PHDEV2 signal as a function of the value of the PHDEV1 signal, is a plot of the gain characteristic (i.e. the ratio of the value of the output signal, PHDEV2, to the value of the input signal, PHDEV1, over the range of values for the PHDEV1 signal) of the gain stage 8. The plot 18 is non-linear (i.e. is not a single straight line). Therefore, the gain characteristic of the gain stage 8 is non-linear.

The plot 18 has three separate sections 20-22. The section 20 exists in the range of $B1 \leq PHDEV1 < -2°$, where B1 is the absolute minimum value which PHDEV1 can take on. The section 21 exists in the range of $-2° \leq PHDEV1 \leq 2°$. The section 22 exists in the range of $2° < PHDEV1 \leq B2$, where B2 is the absolute maximum value which PHDEV1 can take on. Each of the sections 20-22 is linear. The slope of the sections 20, 22 is one. The slope of the section 21 is one fourth. Note that the plot 18 is continuous so that the right most point of the section 20 touches the left most point of the section 21 and the left most point of the section 22 touches the right most point of the section 21.

The gain characteristic of the gain stage 8 can be described by the following equations:

$$PHDEV2 = PHDEV1 + 1.5,\ B1 \leq PHDEV1 < -2°$$

$$PHDEV2 = PHDEV1/4,\ -2° \leq PHDEV1 \leq 2°$$

$$PHDEV2 = PHDEV1 - 1.5,\ 2° < PHDEV1 \leq B2$$

The gain of the gain stage 8 is a function of the value of the phase deviation signal, PHDEV1. The gain changes at a first gain change value, $-2°$, and at a second gain change value, $2°$. If the PHDEV1 signal is less than $-2°$, then the gain is one. If the PHDEV1 signal is between $-2°$ and $2°$, then the gain of the gain stage 8 is one fourth. If the PHDEV1 signal is greater than $2°$, then the gain is one.

Increasing or decreasing the gain of the gain stage 8 increases or decreases, respectively, the gain of the system 4. Increasing the gain of the system 4 provides a faster response to the phase deviation signal, PHDEV1. If the value of the PHDEV1 signal is less than $-2°$ or is greater then $2°$, then the system 4 will have a relatively high gain and will therefore provide an adequate response to large phase deviations. If the value of the PHDEV1 signal is between $-2°$ and $2°$, then the system 4 will have a relatively low gain, thereby preventing continuous rapid phase changes when the phase deviations are relatively small Therefore, the system 4 exhibits the advantages of both a high gain and a low gain synchrophasing system, i.e. the system 4 responds quickly to relatively large phase deviations while still preventing undesirable continuous rapid phase changes.

Referring to FIG. 3, a flowchart 24 illustrates the logic of the gain stage 8. A test step 26 determines if the value of PHDEV1 is less than $-2°$. If the value of PHDEV1 is less than $-2°$, control passes to a step 28 where the value of PHDEV2 is set to the sum of the PHDEV1 signal and a constant 1.5. After the step 28, the process of determining the value of PHDEV2 is completed. If the value of the PHDEV1 signal is not less than $-2°$, control passes from the test step 26 to a test step 30, where the value of PHDEV1 is compared to $2°$. If at the test step 30 the value of PHDEV1 is determined to be greater than $2°$, control passes to a step 32 where the value of PHDEV2 is set to PHDEV1 minus a constant 1.5. After the step 32, the process of determining the value of PHDEV2 is completed. If at the test step 30 the value of PHDEV2 is not greater than $2°$, control passes to a step 34 where the value of PHDEV2 is set to the value of PHDEV1 divided by four. After the step 34, the process of determining the value of PHDEV2 is completed.

Note that the flowchart 24 can be used to describe points on the plot 18. For any value of PHDEV1, the steps of the flowchart 24 will generate the corresponding value of PHDEV2 on the plot 18. The step 28 of the flowchart 24 will generate points of the section 20 of the graph 12, the step 32 will generate points of the section 21, and the step 34 will generate points of the section 22.

FIG. 1 shows that the PHDEV2 signal is coupled to the input of the control stage 10. The control stage 10 applies a linear control law, known to those skilled in the art, and calculates the SPEEDBIAS signal by multiplying the PHDEV2 signal by the control law. The particular control law applied by the control stage 10 is described by the equation:

$$KP + KI/s$$

where KP is the control law proportional gain and KI is the control law integral gain. Therefore, the relationship between the PHDEV2 signal and the SPEEDBIAS signal is illustrated by the equation:

$$SPEEDBIAS = (KP + KI/s) \times PHDEV2$$

However, since the control stage 10 is implemented by software in a microprocessor, the above control law is converted to a discrete digital filter which is executed by the microprocessor of the electronic aircraft engine controller. The discrete digital filter is described by the equations:

$$THI = THIPAST + [KI \times DT \times (PHDEV2 + PHDEV2PAST) \times 0.5]$$

$$SPEEDBIAS = THI + (KP \times PHDEV2)$$

where THI is the portion of the control law corresponding to the integration of the PHDEV2 signal, THIPAST is the value of THI from the previous iteration, DT is the period between iterations, and PHDEV2PAST is the value of the PHDEV2 signal from the previous iteration. For the best mode embodiment of the present invention, KI equals 0.111, KP equals 0.333, and DT, the sampling period, equals 0.04 (i.e. 40 msec.). Therefore, the equations for the control stage 10 are:

$$THI = THIPAST + 0.00222 \times (PHDEV2 + PHDEV2PAST)$$

$$SPEEDBIAS = THI + (0.333 \times PHDEV2)$$

Although the aircraft engine propeller synchrophasing control system 4 is shown as software embedded within a ROM and executed by a microprocessor, all or part of the system 4, including the gain stage 8, may, instead, be implemented by hardware, which would be straight forward in view of the hardware/software equivalence discussed (in another field) in U.S. Pat. No. 4,294,162 entitled "Force Feel Actuator Fault Detection with Directional Threshold" (Fowler et al.). Furthermore, any part of the system 4 which is implemented by hardware may employ analog, instead of digital, signals.

The specific control law, which is applied to the PHDEV2 signal by the control stage 10 in order to generate the SPEEDBIAS signal, can be replaced by another control law capable of generating a signal for controlling the speed of the slave propeller, known to those skilled in the art. The particular control law chosen is dependant upon a variety of functional factors know to those skilled in the art. The specific constants used for the control law may be modified without departing from the spirit and scope of the invention. Furthermore, the output of the control stage 10, the SPEEDBIAS signal, may be redirected to any means for adjusting the speed of one or more aircraft engine propellers Even though the gain characteristics of the gain stage is illustrated as having three separate linear sections 20-22 which exist in the ranges of less than $-2°$, $-2°$ to $2°$, and greater than $2°$, respectively, the number of sections, the range of existence for the sections, and the gain of each section can be changed without departing from the spirit and scope of the invention. A section need not be linear. Any function may be used for a section in order to provide the gain characteristic desired for a particular application. Furthermore, the gain characteristic function can be discontinuous.

Although the invention has been shown and described with respect to exemplary embodiments thereof, it should be understood by those skilled in the art that various changes, omissions and additions may be made therein and thereto, without departing from the spirit and the scope of the invention.

I claim:

1. Apparatus, for synchrophasing aircraft engine propellers, comprising:
    a summer, for providing a first phase deviation signal indicative of the difference between measured relative propeller phase and preferred relative propeller phase;
    a gain stage, responsive to said first phase deviation signal, for providing a second phase deviation signal having a value equal to the product of the value of said first phase deviation signal and a variable gain, said gain varying according to the value of said first phase deviation signal; and
    a control stage, responsive to said second phase deviation signal, for adjusting the speed of one or more of the propellers according to a control law applied to said second phase deviation signal.

2. Apparatus, for synchrophasing aircraft engine propellers, according to claim 1, wherein said variable gain is a equal to a first constant predetermined value in response to said first phase deviation signal being less than a first gain change value, wherein said gain is equal to a second constant predetermined value in response to said first phase deviation signal being greater than a second gain change value, said second gain change value being greater than said first gain change value, and wherein said gain is equal to a third constant predetermined value in response to said first phase deviation signal being greater than or equal to said first gain change value and less than or equal to said second gain change value.

3. Apparatus, for synchrophasing aircraft engine propellers, according to claim 2, wherein said first and second constant predetermined values are equal.

4. Apparatus, for synchrophasing aircraft engine propellers, according to claim 3, wherein said third constant predetermined value is less than said first constant predetermined value.

5. Apparatus, for synchrophasing aircraft engine propellers, according to claim 4, wherein said first and second constant predetermined values equal one.

6. Apparatus, for synchrophasing aircraft engine propellers, according to claim 5, wherein said third constant predetermined value equals one fourth.

7. Apparatus, for synchrophasing aircraft engine propellers, according to claim 6, wherein said first gain change value is $-2°$ and said second gain change value is $2°$.

8. Apparatus, for synchrophasing aircraft engine propellers, according to claim 7, wherein said control law is $KP+KI/s$.

9. Apparatus, for synchrophasing aircraft engine propellers, according to claim 8, wherein KP equals 0.333 and KI equals 0.111.

10. Apparatus, for synchrophasing aircraft engine propellers, according to claim 9, wherein said summer, said gain stage, and said control stage are implemented as microprocessor software embedded in a ROM.

11. A method for using an aircraft engine propeller synchrophasing system having a preferred relative phase signal input, a measured relative phase signal input, and provision for an adjustable gain, comprising the steps of:
    calculating a first phase deviation by subtracting the value of the measured relative phase signal from the value of the preferred relative phase signal;
    determining a gain for the system, wherein said gain is non-linear and varies according to the magnitude of said first phase deviation;
    generating a second phase deviation by multiplying said first phase deviation by said gain; and
    adjusting the speed of one or more aircraft engine propellers according to a control law applied to said second phase deviation.

12. A method for using an aircraft engine propeller synchrophasing system having a preferred relative phase signal input, a measured relative phase signal input, and provision for an adjustable gain, according to claim 11, wherein said gain is determined by the steps of:
    setting said gain to a first constant predetermined value if the magnitude of said first phase deviation is less than a first gain change value;
    setting said gain to a second predetermined value if the magnitude of said first phase deviation is greater than a second gain change value, said second gain change value being greater than said first gain change value; and
    setting said gain to a third predetermined value if the magnitude of said first phase deviation is greater than or equal to said first gain change value and is less than or equal to said second gain change value.

13. A method for using an aircraft engine propeller synchrophasing system having a preferred relative phase signal input, a measured relative phase signal input, and provision for an adjustable gain, according to claim 12, wherein said first and second constant predetermined values are equal.

14. A method for using an aircraft engine propeller synchrophasing system having a preferred relative phase signal input, a measured relative phase signal input, and provision for an adjustable gain, according to claim 13, wherein said third constant predetermined value is less than said first constant predetermined value.

15. A method for using an aircraft engine propeller synchrophasing system having a preferred relative phase signal input, a measured relative phase signal input, and provision for an adjustable gain, according to claim 14, wherein said first and second constant predetermined values equal one.

16. A method for using an aircraft engine propeller synchrophasing system having a preferred relative phase signal input, a measured relative phase signal input, and provision for an adjustable gain, according to claim 15, wherein said third constant predetermined value equals one fourth.

17. A method for using an aircraft engine propeller synchrophasing system having a preferred relative phase signal input, a measured relative phase signal input, and provision for an adjustable gain, according to claim 16, wherein said first gain change value is $-2°$ and said second gain change value is $2°$.

18. A method for using an aircraft engine propeller synchrophasing system having a preferred relative phase signal input, a measured relative phase signal input, and provision for an adjustable gain, according to claim 17, wherein said control law is $KP+KI/s$.

19. A method for using an aircraft engine propeller synchrophasing system having a preferred relative phase signal input, a measured relative phase signal input, and provision for an adjustable gain, according to claim 18, wherein KP equals 0.333 and KI equals 0.111.

* * * * *